(12) United States Patent
Bloch et al.

(10) Patent No.: US 8,036,393 B2
(45) Date of Patent: *Oct. 11, 2011

(54) PROVIDING AUDIO-GUIDED DEPLOYMENT OF DATA PROCESSING SYSTEMS

(75) Inventors: Douglas R. Bloch, Austin, TX (US); John C. Hilburn, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 662 days.

This patent is subject to a terminal disclaimer.

(21) Appl. No.: 12/124,652

(22) Filed: May 21, 2008

(65) Prior Publication Data
US 2008/0221956 A1 Sep. 11, 2008

Related U.S. Application Data

(63) Continuation of application No. 11/301,102, filed on Dec. 12, 2005, now Pat. No. 7,715,570.

(51) Int. Cl.
*H04R 29/00* (2006.01)

(52) U.S. Cl. ......... 381/58; 705/7.11; 340/692; 434/319; 53/75

(58) Field of Classification Search .............. 381/58, 381/56, 61, 80, 81, 124; 705/7, 7.11, 7.26; 434/319; 53/74, 75, 76; 715/705, 708; 340/692, 340/691.1, 500
See application file for complete search history.

(56) References Cited

U.S. PATENT DOCUMENTS

| 5,903,266 | A  | 5/1999  | Berstis et al. |
| 6,966,032 | B1 | 11/2005 | Anderson |
| 6,974,928 | B2 | 12/2005 | Bloom |
| 7,715,570 | B2 | 5/2010  | Bloch |

FOREIGN PATENT DOCUMENTS

| EA | 0002932 B1   | 10/2002 |
| EP | 1176779 A2   | 1/2002  |
| WO | 03/094367 A2 | 11/2003 |

OTHER PUBLICATIONS

Tran, Con—Office Action dated Oct. 5, 2009, Application No. 11/301,102.
Tran, Con—Notice of Allowability dated Dec. 30, 2009, Application No. 11/301,102.

*Primary Examiner* — Vivian Chin
*Assistant Examiner* — Con P Tran
(74) *Attorney, Agent, or Firm* — Dillon & Yudell LLP

(57) ABSTRACT

A method for providing audio-guided deployment of a data processing system is disclosed. An unpack instruction related to a data processing system in a first container for audio presentation is designated, and one or more position sensors in the first container are queried to determine whether the position sensors are spatially configured for audible presentation of the unpack instruction. In response to determining that the position sensors are not spatially configured for the audible presentation of the unpack instruction, a position sensor error message is audibly presented. One or more radio frequency sensors associated with the first container are queried to determine whether the first container contents are ready for audible presentation of the instruction, and in response to determining that the first container contents are not ready for audible presentation of the unpack instruction, a radio-frequency sensor error message is audibly presented. In response to determining that the first container contents are ready for audible presentation of the unpack instruction, audio-guided deployment of the data processing system is provided by audibly presenting the unpack instruction.

20 Claims, 3 Drawing Sheets

US 8,036,393 B2

PROVIDING AUDIO-GUIDED DEPLOYMENT OF DATA PROCESSING SYSTEMS

The present application is a continuation of U.S. patent application Ser. No. 11/301,102, filed on Dec. 12, 2005, entitled "Method and System for Providing Audio-Guided Deployment of Data Processing Systems". Applicants claim benefit of priority under 35 U.S.C §120 to U.S. patent application Ser. No. 11/130,102 which is incorporated by reference herein in its entirety and for all purposes.

BACKGROUND OF THE INVENTION

1. Technical Field

The present invention relates in general to packaging systems and in particular to packaging systems for data processing systems. Still more particularly, the present invention relates to a system, method and computer program product for providing audio-guided deployment of data-processing systems.

2. Description of the Related Art

With the increasing penetration of computers and information technology into the lives of Americans, a division in quality of life has developed between those with access to computing technology and those without. Services available to those with access include a wealth of commercial, social, and informational opportunities. Unfortunately, studies suggest that Americans with disabilities are less than half as likely as their non-disabled counterparts to own a computer, and they are about one-quarter as likely to use the Internet.

Computer technology and the Internet have a tremendous potential to broaden the lives and increase the independence of people with disabilities. Those who have difficulty leaving their homes can now log in and order groceries, shop for appliances, research health questions, participate in online discussions, catch up with friends, or make new ones. Blind people, who previously waited months or years for the information they needed to be made available in Braille or on audiotape, can now access (through text-to-speech adaptations to web browsers) the very same news stories, magazine articles, government reports, and information on consumer products at the very same time it becomes available to the sighted population. People who have difficulty holding a pen or using a keyboard can use the latest speech recognition software to write letters, pay their bills, or perform work-related tasks.

While these new technologies hold great promise, the computer revolution has left many people with disabilities behind. Studies suggest that only one-quarter of people with disabilities own computers, and only one-tenth ever make use of the Internet. Elderly people with disabilities, and those with low educational attainment, are even less likely to take advantage of these new technologies.

Just as with people who are not handicapped, the installation and deployment of new computing devices is a significant barrier to initial access for people with disabilities. Deployment usually depends on the ability to decipher manuals which, while they sometimes make sense to the experienced user, are not particularly helpful to the novice. What is needed is a method to simplify the deployment of new computing devices.

SUMMARY OF THE INVENTION

A method for providing audio-guided deployment of a data processing system is disclosed. An unpack instruction related to a data processing system in a first container is designated for audible presentation, and one or more position sensors in the first container are queried to determine whether the position sensors are spatially configured for audible presentation of the unpack instruction. In response to determining that the position sensors are not spatially configured for the audible presentation of the unpack instruction, a position sensor error message is audibly presented. One or more radio frequency sensors associated with the first container are queried to determine whether the first container contents are ready for audible presentation of the instruction, and in response to determining that the first container contents are not ready for audible presentation of the unpack instruction, a radio-frequency sensor error message is audibly presented. In response to determining that the first container contents are ready for audible presentation of the unpack instruction, audio-guided deployment of the data processing system is provided by audibly presenting the unpack instruction.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

The present invention provides a method, system, and computer program product for providing audio-guided deployment of a boxed data processing system. The present invention uses a dedicated-purpose data processing system to query a series of sensors associated with one or more containers. In response to discovering the status of the associated sensors, the dedicated-purpose data processing system audibly presents a series of error messages and instructions, as appropriate, to guide a user through the deployment of the boxed data processing system, components of which are contained in the one or more containers. This audible presentation of deployment instructions enables users to deploy the data processing system without the need to interact with large volumes of printed material. By reducing reliance on printed material, the present invention improves the deployability of the boxed data processing system for sight-impaired users. Further, the interactive nature of instructions and error messages selected on the basis of sensor queries provides a substantially less error-prone deployment for all users, and particularly for those less familiar with deploying data processing systems. Finally, use of the present of invention can result in cost savings through the elimination of expensive printed materials.

Figure 1:
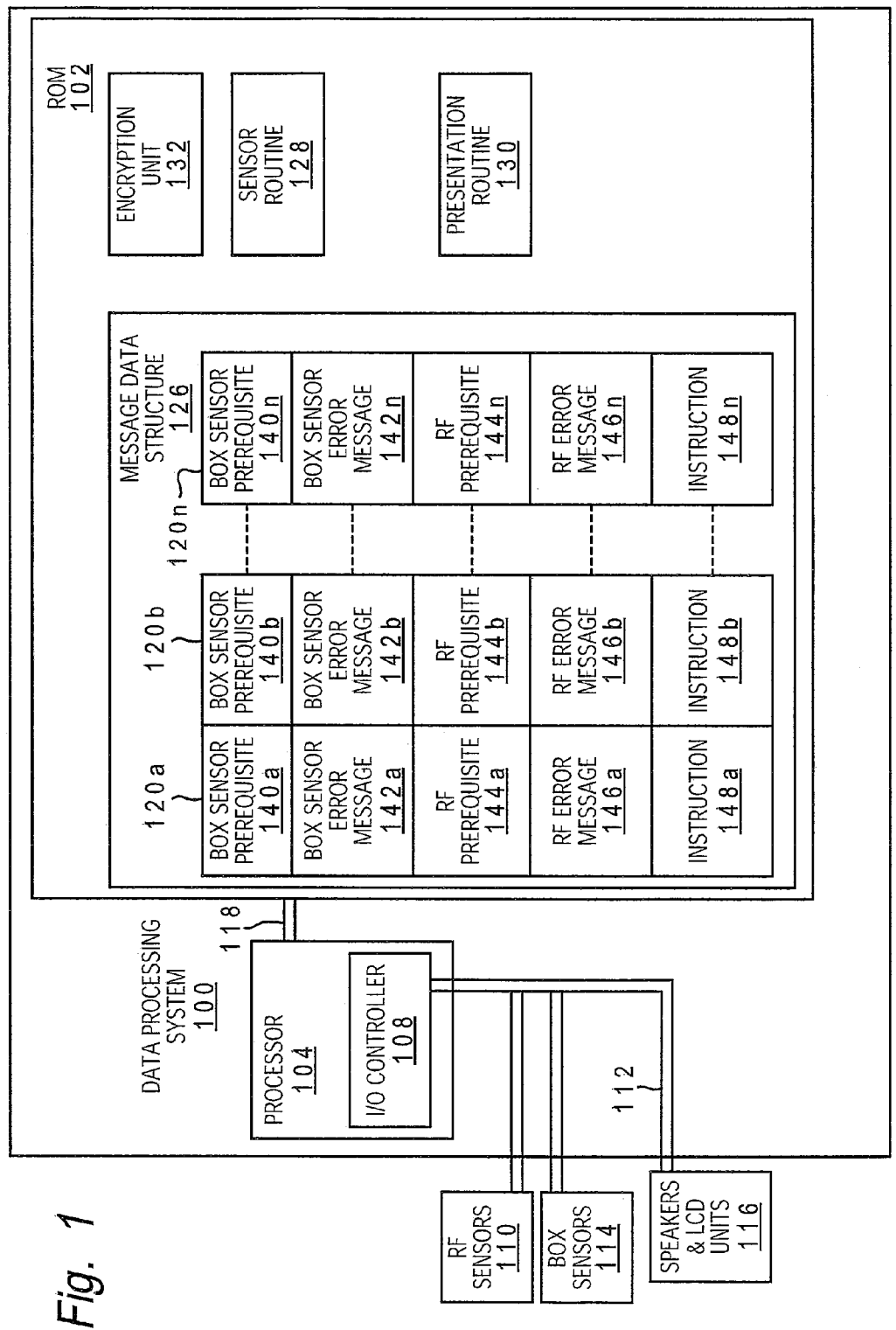
FIG. 1 depicts a block diagram of a dedicated-purpose data processing system with which the present invention of a method, system and computer program product for providing audio-guided deployment of data-processing systems may be performed.

With reference now to the figures, and in particular with reference to FIG. 1, a block diagram of a dedicated-purpose data processing system, in accordance with a preferred embodiment of the present invention, is depicted. Dedicated-purpose data processing system 100 contains a processing storage unit (e.g., ROM 102) and a processor 104. An Input/Output (I/O) controller 108 provides connectivity to a set of RF sensors 110 through a wired link, such as an I/O harness 112. I/O controller 108 also connects to box sensors 114 such as a buttons, magnetic field sensors, or connectivity sensors. Additionally, I/O controller 108 connects speakers and LCD units 116 to system interconnect 118 connects processor 104 to ROM 102.

Within ROM 102, dedicated-purpose data processing system 100 stores several items of data and instructions while operating in accordance with a preferred embodiment of the present invention. These include a sensor routine 128 for determining the status of RF sensors 110 and box sensors 114. A presentation routine 130 audibly (and optionally visually) presents instructions 148a-148n, RF error messages 146a-146n and box sensor error messages 142a-142n through speakers and LCD units 116 in response to status checks of RF prerequisites 140a-140n. An encryption unit 132 is also provided for encrypting the communications of RF sensors 110.

ROM 102 also contains a message data structure 126, which includes a first instruction routine 120a composed of a first box sensor prerequisite 140a, a first box sensor error message 142a, a first RF prerequisite 144a, a first RF error message 146a and a first instruction 148a. Message data structure 126, also includes a second instruction routine 120b composed of a second box sensor prerequisite 140b, a second box sensor error message 142b, a second RF prerequisite 144b, a second RF error message 146b and a second instruction 148b. Finally, message data structure 126 includes and an nth instruction routine 120n composed of an nth box sensor prerequisite 140n, an nth box sensor error message 142n, an nth RF prerequisite 144n, an nth RF error message 146n and an nth instruction 148n.

While message data structure 126 is shown with only three instruction routines 120a-120n, one skilled in the art will quickly realize that the method of the present invention will allow for the use of an extensive series of instruction routines 120a-120n within message data structure 126. Through the use of an extensive series of instruction routine 120a-120n within message data structure 126, the present invention can be extended to a vast series of small instructions for a variety of complex deployment tasks.

Figure 2:
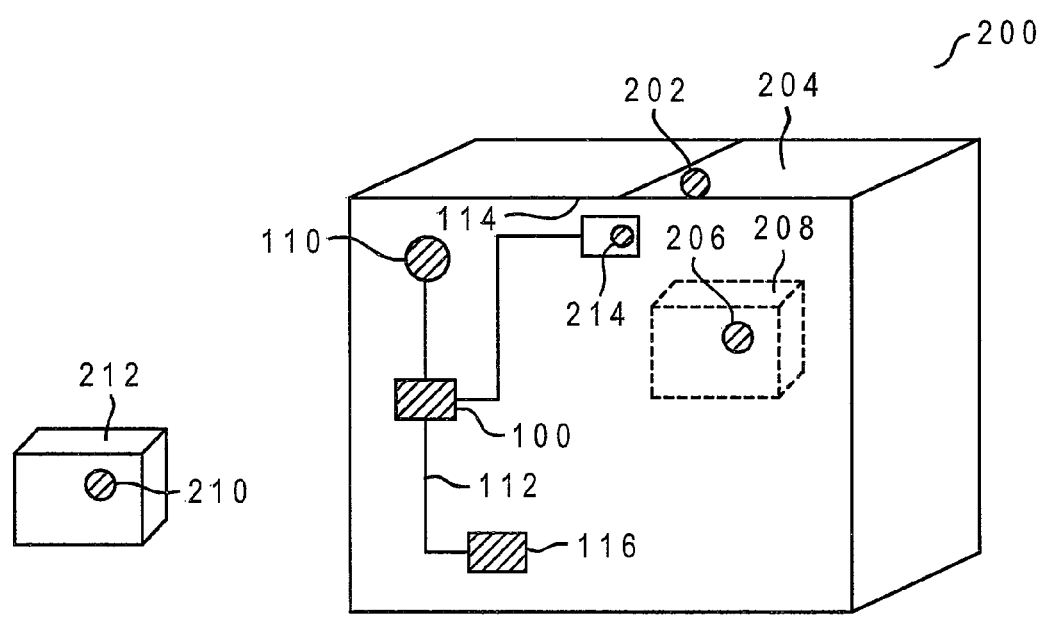
FIG. 2 illustrates a view of the attachment of a dedicated-purpose data processing system and related peripherals to multiple containers with which the present invention of a method, system and computer program product for providing audio-guided deployment of data-processing systems may be performed.

Turning now to FIG. 2, a view of the attachment of a dedicated-purpose data processing system and related peripherals to multiple containers with which the present invention of a method, system and computer program product for providing audio-guided deployment of data-processing systems may be performed is illustrated. Dedicated-purpose data processing system 100, set of RF sensors 110, I/O harness 112, box sensors 114 and speakers and LCD units 116 are attached to a first container 200. A magnetic position sensor actuator 202 (containing a magnet) is attached to a flap 204 of first container 200, for the purpose of enabling a magnetic field sensor among box sensors 114 to ascertain whether flap 204 has been opened. While this magnetic field sensor among box sensors is an example of position sensors being used to ascertain whether a container is spatially configured for use, those skilled in the art will be aware that other embodiments of position sensors will be equally applicable without departing from the scope of the present invention. Box sensors 114 also include an exemplary button 214 for user actuation. As a further example, a user can be instructed to actuate a button after performing each instruction, e.g., after spatially configuring a portion of the container. A first remote radio-frequency unit 206 is mounted on a second container 208, which is stored within first container 200, to allow dedicated-purpose data processing system 100 to ascertain by communication (encrypted with encryption unit 132) between RF sensors 110 and first remote radio-frequency unit 206 whether second container 208 has been removed from first container 200. Additionally, a second remote radio-frequency unit 210 is mounted to a third container 212 to allow dedicated-purpose data processing system 100 to ascertain by communication (encrypted with encryption unit 132) between RF sensors 110 and second remote radio-frequency unit 210 the proximity and status of third container 212.

Figure 3:
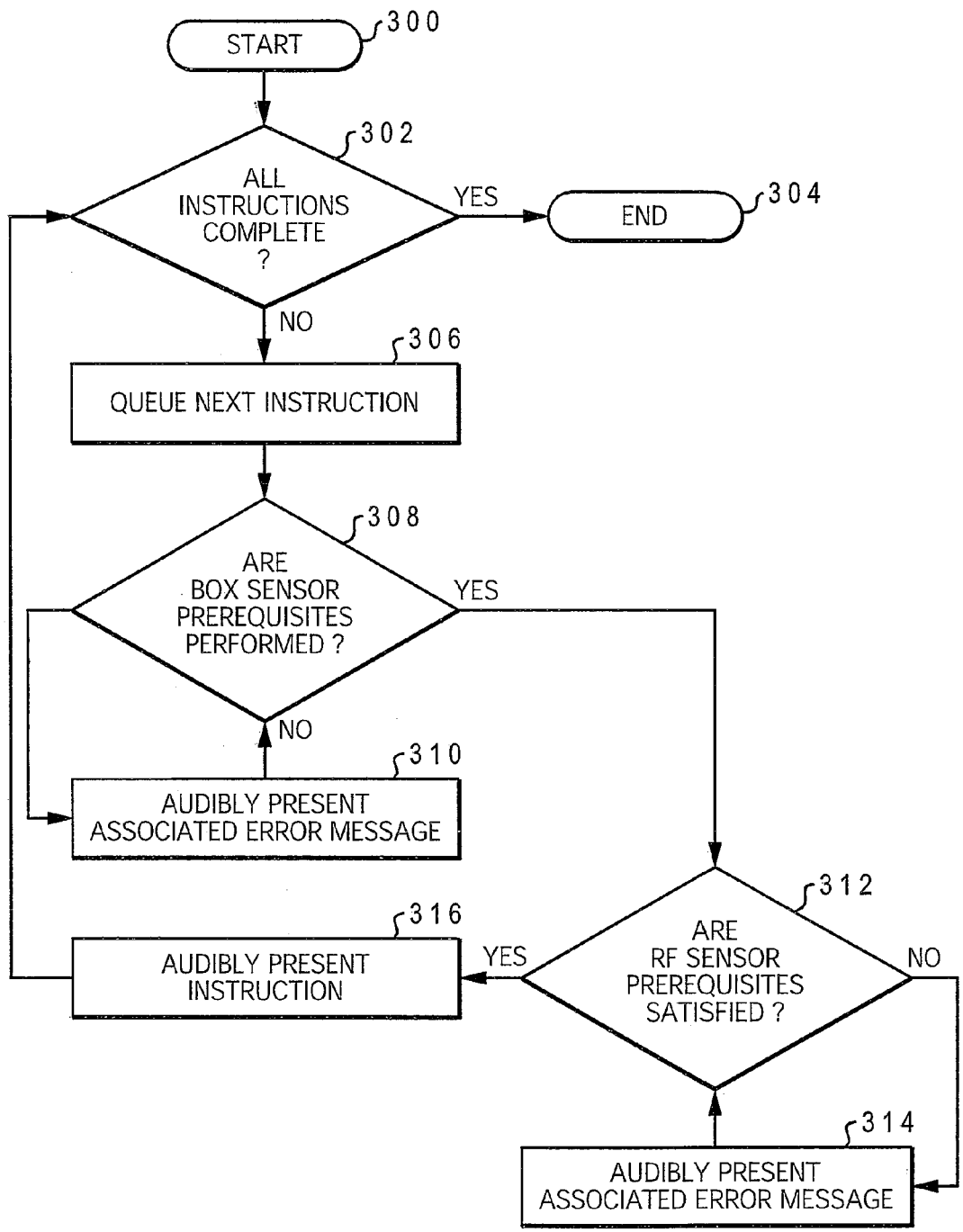
FIG. 3 is a high-level logical flowchart of a process for providing audio-guided deployment of data-processing systems.

Referring now to FIG. 3, a high-level logical flowchart of a process for providing audio-guided deployment of data-processing systems is illustrated. The process starts at step 300 and then moves to step 302, which depicts processor 104 determining whether all of instruction routines 120a-120n within message data structure 126 have been audibly presented through speakers and LCD units 116. If all of instruction routines 120a-120n within message data structure 126 have been audibly presented through speakers and LCD units 116, then the process ends at step 304. If all of instruction routines 120a-120n within message data structure 126 have not been audibly presented through speakers and LCD units 116, then the process next moves to step 306. Step 306 illustrates processor 104 queuing a next instruction routine 120a from among instruction routines 120a-120n within message data structure 126.

The process then moves to step 308, which depicts processor 104 determining by calling sensor routine 128 to query box sensors 114 whether box sensor prerequisite 140a has been met. A box sensor prerequisite 140a-140n can include a variety of requirements related to a variety of forms of box sensors 114. As illustrated in FIG. 2, box sensors 114 include a button 214, which could be used as a 'start button' or a 'next' button. Box sensor prerequisite 140a can require that button 214 has been depressed. Additionally, box sensors 114 include a magnetic field sensor, as described above. A magnetic position sensor actuator 202 (containing a magnet) is attached to a flap 204 of first container 200, for the purpose of enabling a magnetic field sensor among box sensors 114 to ascertain whether flap 204 has been opened. Box sensor prerequisite 140a can require that a magnetic field sensor among box sensors 114 indicate a magnetic field consistent with the movement of magnetic position sensor actuator 202 to a position indicating that flap 204 is open.

If processor 104 determines by calling sensor routine 128 to query box sensors 114 that box sensor prerequisite 140a has not been met, then the process proceeds to step 310. Step 310 illustrates processor 104 using presentation routine 130 to audibly present box sensor error message 142a over speakers and LCD units 116. Box sensor error message 142a may be an error message, spoken in a language understood by the user, instructing the user to perform an action such as opening first container 200 at flap 204. After processor 104 uses presentation routine 130 to audibly present box sensor error message 142a over speakers and LCD units 116, then the process returns to step 308.

Returning to step 308, if processor 104 determines by calling sensor routine 128 to query box sensors 114 that box sensor prerequisite 140a has been met, then the process proceeds to step 312, which illustrates processor 104 determining by calling sensor routine 128 to query RF sensors 110 (through encryption by encryption unit 132) as to whether RF sensor prerequisite 144a has been met. An RF sensor prerequisite 144a-144n can include a variety of requirements related to the status of a remote radio-frequency transceiver such as a first remote radio-frequency unit 206 or second remote radio-frequency unit 210.

As illustrated in FIG. 2, first remote radio-frequency unit 206 can be used to determine the proximity of second container 208 to RF sensors 110, and thereby determine whether second container 208 has been removed from the interior of first container 100. As illustrated in FIG. 2, second remote radio-frequency unit 210 can be used to determine the proximity of third container 212 to RF sensors 110, and thereby determine if all required materials are on hand. One skilled in the relevant art will quickly realize that more complex information related to the status of a remote radio-frequency transceiver such as a first remote radio-frequency unit 206 or second remote radio-frequency unit 210 can be transmitted, and that alternative embodiments of related to the status of a remote radio-frequency transceiver such as a first remote radio-frequency unit 206 or second remote radio-frequency unit 210 might include their own sensors and processors for determining the status of second container 208 and third container 212, respectively.

If processor 104 determines by calling sensor routine 128 to query RF sensors 110 that RF sensor prerequisite 144a has not been met, then the process proceeds to step 314. Step 314 illustrates processor 104 using presentation routine 130 to audibly present RF sensor error message 146a over speakers and LCD units 116. RF sensor error message 146a may be an error message, spoken in a language understood by the user, instructing the user to perform an action such as opening the removing second container 208 from the interior of first container 200 or retrieving third container 212 and bringing it into closer proximity with first container 200. After processor 104 uses presentation routine 130 to audibly present RF sensor error message 146a over speakers and LCD units 116, then the process returns to step 312.

Returning to step 312, if processor 104 determines by calling sensor routine 128 to query RF sensors 110 that RF sensor prerequisite 144a has been met, then the process proceeds to step 316, which illustrates processor 104 using presentation routine 130 to audibly present instruction 148a. Instruction 148a will be a message spoken in a language understood by the user, instructing the user to perform an action such as removing the contents of first container 200. The process then returns to step 302, which is described above.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communication links.

What is claimed is:

1. A method for providing audio-guided deployment for unpacking at least a first container, said method comprising:
designating an unpack instruction related to a data processing system in a first container for audible presentation;
in response to determining that one or more position sensors are not configured for said audible presentation of said unpack instruction, audibly presenting a position sensor error message;
in response to determining that said first container contents are not ready for audible presentation of said unpack instruction, audibly presenting a radio-frequency sensor error message; and
in response to determining that said first container contents are ready for audible presentation of said unpack instruction, providing audio-guided deployment of said data processing system by audibly presenting said unpack instruction from an audio source located within said first container.

2. The method of claim 1, further comprising:
querying said one or more position sensors in said first container to determine whether said position sensors are configured for said audible presentation of said unpack instruction; and
querying said one or more radio frequency sensors associated with said first container to determine whether said first container contents are ready for said audible presentation of said instruction.

3. The method of claim 1, wherein said querying one or more radio frequency sensors associated with said first container to determine whether said first container contents are ready for audible presentation of said instruction further comprises, in response to determining over an encrypted communication that said position sensors are spatially configured for said audible presentation of said unpack instruction, querying one or more radio frequency sensors associated with said first container to determine whether said first container contents are ready for audible presentation of said instruction.

4. The method of claim 1, wherein the querying said one or more position sensors in said first container to determine whether said position sensors are spatially configured for audible presentation of said unpack instruction design further comprises querying a magnetic field sensor.

5. The method of claim 1, wherein said querying one or more radio frequency sensors associated with said first container to determine whether said first container contents are ready for audible presentation of said instruction further comprises querying one or more radio frequency sensors associated with said first container and located in a second container, wherein said second container is located outside of said first container.

6. The method of claim 1, wherein said querying one or more radio frequency sensors associated with said first container to determine whether said first container contents are ready for audible presentation of said instruction further comprises querying one or more radio frequency sensors associated with said first container and located in a second container, wherein said second container is located within said first container.

7. The method of claim 1, wherein said querying one or more radio frequency sensors associated with said first container to determine whether said first container contents are ready for audible presentation of said instruction further comprises querying said one or more radio frequency sensors associated through transmissions encrypted using an encryption unit.

8. A data processing system for providing audio-guided deployment of a data processing system, said data processing system comprising:
- a processor; and
- data storage coupled to the processor, the data storage including program code that, when processed by the processor, causes said data processing system to perform:
  - designating an unpack instruction related to a data processing system in a first container for audible presentation;
  - querying one or more position sensors in said first container to determine whether said position sensors are spatially configured for audible presentation of said unpack instruction;
  - in response to determining that said position sensors are not spatially configured for said audible presentation of said unpack instruction, audibly presenting a position sensor error message;
  - querying one or more radio frequency sensors associated with said first container to determine whether said first container contents are ready for audible presentation of said instruction;
  - in response to determining that said first container contents are not ready for audible presentation of said unpack instruction, audibly presenting a radio-frequency sensor error message; and
  - in response to determining that said first container contents are ready for audible presentation of said unpack instruction, providing audio-guided deployment of said data processing system by audibly presenting said unpack instruction.

9. The data processing system of claim 8, wherein said querying one or more radio frequency sensors includes:
- in response to determining over an encrypted communication that said position sensors are spatially configured for said audible presentation of said unpack instruction, querying one or more radio frequency sensors associated with said first container to determine whether said first container contents are ready for audible presentation of said instruction.

10. The data processing system of claim 8, wherein the querying said one or more position sensors includes querying a magnetic field sensor.

11. The data processing system of claim 8, wherein said querying one or more radio frequency sensors includes querying one or more radio frequency sensors associated with said first container and located in a second container, wherein said second container is located outside of said first container.

12. The data processing system of claim 8, wherein said querying one or more radio frequency sensors includes querying one or more radio frequency sensors associated with said first container and located in a second container, wherein said second container is located within said first container.

13. The data processing system of claim 8, wherein said querying one or more radio frequency sensors includes querying said one or more radio frequency sensors associated through transmissions encrypted using an encryption unit.

14. The data processing system of claim 8, wherein the querying said one or more position sensors includes querying a button for user input.

15. A program product, comprising:
- a tangible machine-readable storage medium;
- program code stored on the tangible machine-readable storage medium, wherein said program code, when processed by a machine, causes said machine to perform:
  - designating an unpack instruction related to a data processing system in a first container for audible presentation;
  - querying one or more position sensors in said first container to determine whether said position sensors are spatially configured for audible presentation of said unpack instruction;
  - in response to determining that said position sensors are not spatially configured for said audible presentation of said unpack instruction, audibly presenting a position sensor error message;
  - querying one or more radio frequency sensors associated with said first container to determine whether said first container contents are ready for audible presentation of said instruction;
  - in response to determining that said first container contents are not ready for audible presentation of said unpack instruction, audibly presenting a radio-frequency sensor error message; and
  - in response to determining that said first container contents are ready for audible presentation of said unpack instruction, providing audio-guided deployment of said data processing system by audibly presenting said unpack instruction.

16. The program product of claim 15, wherein said step of querying one or more radio frequency sensors associated with said first container to determine whether said first container contents are ready for audible presentation of said instruction further comprises, in response to determining over an encrypted communication that said position sensors are spatially configured for said audible presentation of said unpack instruction, querying one or more radio frequency sensors associated with said first container to determine whether said first container contents are ready for audible presentation of said instruction.

17. The program product of claim 15, wherein the step of querying said one or more position sensors in said first container to determine whether said position sensors are spatially configured for audible presentation of said unpack instruction design further comprises querying a magnetic field sensor.

18. The program product of claim 15, wherein said step of querying one or more radio frequency sensors associated with said first container to determine whether said first container contents are ready for audible presentation of said instruction further comprises querying one or more radio frequency sensors associated with said first container and located in a second container, wherein said second container is located outside of said first container.

19. The program product of claim 15, wherein said step of querying one or more radio frequency sensors associated with said first container to determine whether said first container contents are ready for audible presentation of said instruction further comprises querying one or more radio frequency sensors associated with said first container and located in a second container, wherein said second container is located within said first container.

20. The program product of claim 15, wherein said step of querying one or more radio frequency sensors associated with said first container to determine whether said first container contents are ready for audible presentation of said instruction further comprises querying said one or more radio frequency sensors associated through transmissions encrypted using an encryption unit.

* * * * *